Patented Apr. 13, 1954

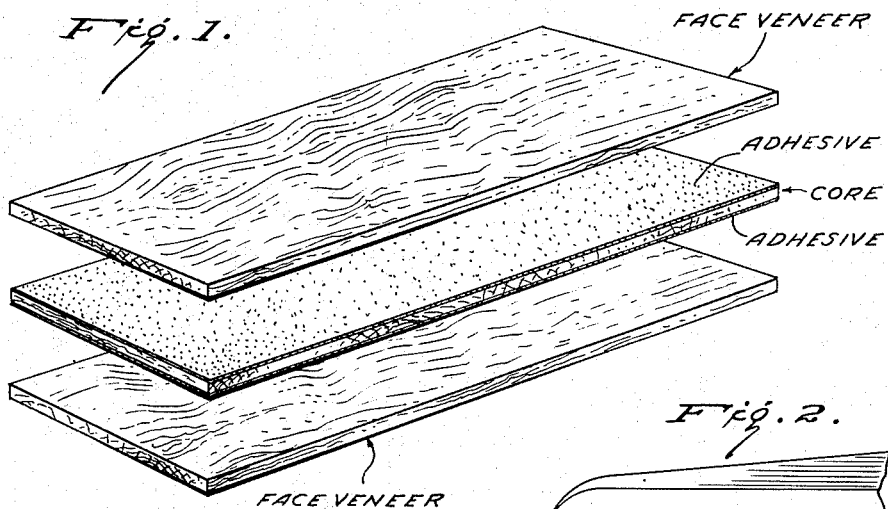
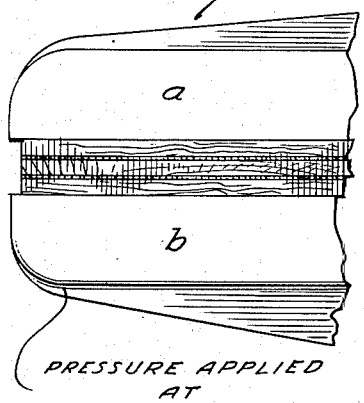
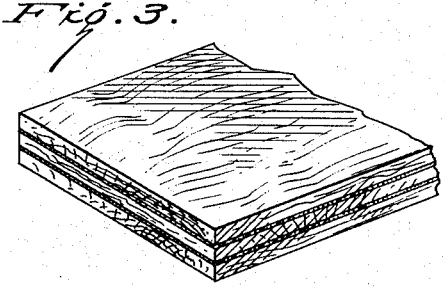
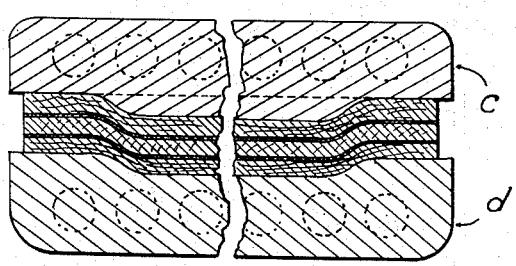

2,675,338

UNITED STATES PATENT OFFICE 2,675,338

PROCESS FOR POST FORMING PLYWOOD

Dorothea S. Phillips, Meredith, N. H., assignor to American Cyanamid Company, New York, N. Y., a corporation of Maine Application January 18, 1951, Serial No. 206,568

6 Claims. (Cl. 154—110)

This invention relates to a process for post-forming plywood articles and, more particularly, this invention relates to a process for post-forming plywood articles by means of a particular adhesive applied to the surfaces of wood ply cores and combining said cores with face veneers into a substantially flat assembly and uniting said assembly into a flat unitary structure by the application of pressure at room temperature thereafter permanently deforming said flat structure by the application of heat and pressure thereto between the faces of a mold. Still further, this invention relates to a process for post-forming plywood articles which have a water resistant adhesive bonding the plies into a unitary structure.

One of the objects of the present invention is to prepare plywood articles having contoured surfaces according to the process of the present invention. A further object of the present invention is to produce post-formed plywood articles, the bonds of which have substantially increased resistance to water. A still further object of the present invention is to prepare a plywood article having a flat unitary structure which can be surface-finished and then subsequently deformed by the application of heat and pressure to a permanently shaped article which has no internal strains tending to return the article to its original flat condition. A still further object of the present invention is to produce plywood articles comprising a plurality of wood plies the surfaces of which are coated with an adhesive material comprising about 5–75% by weight of emulsified polyvinyl acetate and about 25–95% by weight of a water dispersible, thermosetting aminoplast resin such as melamine-formaldehyde resin and urea-formaldehyde resin and combining said plies into a substantially flat assembly and uniting said assembly into a flat, unitary structure by the application of pressure at room temperature, i. e., 25° C. thereafter deforming said flat structure by the application of heat and pressure thereto between the faces of a mold.

In the manufacture of plywood articles, it is often desired to produce for certain uses plywood articles which have contoured surfaces. The manner of producing such contoured surfaced plywood articles has presented a serious problem to the industry engaging in such manufacture. Conventional adhesives could be used which would enable one to bond the wood plies together and deform to the desired shape in a single operation by use of a thermosetting adhesive composition. The shortcoming to such an approach resides primarily in the fact that the finishing of the surface of such a deformed plywood article must be accomplished after the deformation has been completed and, as a consequence, the finishing of the surface has to be completed manually. If one were able to use an adhesive material which would give sufficient cold set bond to the plies so as to enable one to work on the flat bonded assembly and give it a smooth surface finish such as by planing or sanding, one could then deform the unitary structure by the application of heat and pressure thereby eliminating the necessity of manual finishing of the final permanently deformed product. The applicant has discovered that by using a particular adhesive composition comprising 5%–75% by weight of polyvinyl acetate and 25–95% by weight of a water dispersible, thermosetting aminoplast resin, such as melamine-formaldehyde resin or urea-formaldehyde resin or a melamine-urea-formaldehyde resin or mixture of these resins, one develops sufficient tack and bond due to the presence of the polyvinyl acetate that a flat unitary structure can be produced in which the several plies remain united during the subsequent machining of the plywood object. The object may be cut to a particular configuration or desired design, the surface may be sanded or rendered smooth by any desired method and upon completion of the surfacing and other treatment of the object, the flat unitary structure may be deformed to the desired shape simply by applying heat and pressure to the flat unitary structure between the faces of a mold. The polyvinyl acetate present in the adhesive composition is thermoplastic and upon the application of heat becomes softened and permits the slippage of the various components of the structure into their molded positions. This slippage is further facilitated by the transition of the thermosetting portion of the resin through its fluid stage of cure. These factors enable one to deform the plywood structure to the desired shape, whereupon the thermosetting resin component of the adhesive, upon continued application of heat, becomes thermoset in its new contours and displays no evidence of internal strain or plastic memory. The polyvinyl acetate component of the adhesive material being thermoplastic will similarly assume the contours of its new surroundings after the application of heat and pressure when the temperature is permitted to return to room temperature. In the preparation of the unitary structure into a flat assembly one may use no heat whatever while applying the pressure to form said structure and this embodiment is preferred. One may use, however, some small measure of heat if desired but under no circumstances should the temperature be permitted to rise above about 50° C. This is, of course, during the preliminary step wherein the structure is substantially flat. After the flat assembly has been united into one structure and when the surface finishing has been accomplished sufficient heat and pressure should be applied to the structure so as to deform it into the desired shape. This heating results in a cure of the thermosetting resinous component of the adhesive material.

The prior art discloses a plurality of ways in which plywood may be manufactured. The generally accepted method for the manufacture of three ply plywood is to apply the adhesive material to both sides of the center piece of core, then to apply the face veneers upon the wet cores and the usual practice has been, in many of the mills, to subject the adhesive spread panels to pressure, such as in a hydraulic press, for four to twenty four hours. Some manufacturers, using a cold set adhesive, apply no heat, merely pressure. Others use a cold press for several hours, followed by a hot press. This latter embodiment is used in those instances in which the adhesive used has a tendency to force its way through the face veneers and stain the faces of the panels during the hot press step. The actual coating of the plies with the adhesive can be accomplished in a plurality of ways, for instance one could apply the adhesive to both sides of the core ply in three ply plywood and combine with the uncoated face veneers, thereby coating the face veneers or one could coat the inner surface of the face veneers and combine with the uncoated core ply, thereby coating the core ply. Still further, one could coat at least one surface of each of the plies and combine the plies with the coated surfaces of the face veneers directed toward the center of the plywood assembly. These and other obvious methods of approach are well known by those skilled in the art and further delineation is deemed unnecessary. It should be remembered, however, that all of these modifications may be used without departing from the spirit and essence of the present invention.

The accompanying drawing is illustrative of the concept of the present invention in which Figure 1 illustrates a core, on each side of which there is a layer of adhesive material, and finally a layer of face veneer on each side of the adhesive layer. In Figure 2, this assembly of plies (core plies and face veneer plies) are combined into a unitary structure by the application of pressure at room temperature between the faces, $a$ and $b$, of a flat press to form the unitary structure as illustrated in Fig. 3. Fig. 4 illustrates the formation of the contoured plywood article after the surfacing and other operations have been completed on the flat unitary structure. In Figure 4, the mold complements $c$ and $d$, are pressed against the flat, unitary structure while applying heat thereto. The finished product, illustrated in Fig. 5, is a permanently deformed plywood article which displays no tendency to return to its original flat shape.

It has been stated hereinabove that one may use in the adhesive material along with the polyvinyl acetate either urea-formaldehyde resins, melamine-formaldehyde resins, mixtures of these two resins or melamine-urea-formaldehyde resins. When the urea-formaldehyde resin is used as the sole resinous component with the polyvinyl acetate, excellent bonds are developed but these bonds do not have the water resistance which are realized when melamine is used either exclusively or in combination with the urea resins. When the urea and melamine resins are used in combination with one another, the urea resin should be present in an amount not greater than 75% by weight of the total weight of the resinous component if water resistant bonds are desired. If the melamine-urea-formaldehyde resin is used, the urea component should not constitute more than 75% of the total number of mols of the melamine and urea present in the resin. In preparing the urea-formaldehyde resins, any mol ratio may be used such as between 1:1 and 1:4, urea to formaldehyde, respectively. It is, however, desired to use mol ratios of 1:1.3 to 1:3, respectively, with optimum results being accomplished when the mol ratio is 1:1.7 to 1:2.5, respectively. In the preparation of the melamine-formaldehyde resin, one may use mol ratios between 1:1 and 1:6, melamine to formaldehyde, respectively, but it is preferred to use 1:2–1:3, respectively. In the preparation of the adhesive material, it is preferred that there be no acid catalyst present as the catalyst would cure the resinous component at room temperature and it should be clear from the above discussion that it is desired that the cure of the adhesive material be accomplished only upon the application of heat and pressure. It is, then, desirable to control the pH of the resinous composition within the range of about 5–11 and preferably within the range of 7 to 9.

If the resinous composition is to be used immediately upon preparation, the aqueous dispersion of the aminoplast resin can be blended with the pre-emulsified polyvinyl acetate in a dry state so that the latter becomes dispersed in the former. If an aqueous emulsion of the polyvinyl acetate is used, it can be dispersed in the aqueous dispersion of the resin or the dry aminoplast resin can be incorporated in the aqueous emulsion of the polyvinyl acetate. In the event that the resinous material is prepared far in advance of use, either or both of the components may be dried separately or in combination by any conventional method such as spray drying, tray drying, kettle drying and the like. The components may be dried together or separately or the resinous component can be dried and redispersed in the aqueous emulsion of the polyvinyl acetate or the pre-emulsified polyvinyl acetate in the dry state can be redispersed in the aqueous dispersion of the resin. Although it has been indicated hereinabove that one may use between 5 and 75% by weight of the polyvinyl acetate, it is actually preferred that the polyvinyl acetate be present in an amount not greater than about 25%, by weight, for optimum results.

The following examples are set forth for the purpose of illustrating the processes for the preparation of the aminoplast resins per se. These examples are set forth solely for the purpose of illustration and should not be interpreted as limitations on the case except as indicated by the appended claims. All parts are parts by weight.

Urea-formaldehyde resin 174 parts of a 37% aqueous formaldehyde solution and 62.2 parts of urea are charged into a suitable reaction kettle and the pH of the mixture is adjusted by the use of 10 N sodium hydroxide to about 8. The mixture is then heated to reflux and is held at that temperature for about 15 minutes. The syrup is then cooled to about 90° C. and 13.8 parts of urea are added, and the pH is adjusted to about 5.5. The mixture is then reheated to reflux and held at that temperature for 60-90 minutes. The pH is raised to about 8 by addition of a sufficient quantity of triethanolamine, and the syrup is then cooled to about 25° C. The syrup may then be discharged into a blending tank for preparation for use in admixture with the polyvinyl acetate emulsion.

Melamine-formaldehyde resins 126 parts of melamine and 162 parts of a 37% aqueous formaldehyde solution are introduced into a suitable reaction chamber equipped with thermometer, stirrer and reflux condenser. The pH of the mixture is adjusted to about 6.5-7 and the mixture is heated to 85° C. in 30-40 minutes at which point the pH will have risen to about 8. The batch is then cooled to about 70° C. and held at that temperature for about 90-120 minutes. The pH is then adjusted to about 9.

Melamine-formaldehyde, urea-formaldehyde resin

Equal parts of the resins prepared according to each of the preceding examples are stirred together into a syrupy mixture until a smooth blend is obtained. The mixture may be used directly in combination with the polyvinyl acetate or it may be spray dried for storage.

Melamine-urea-formaldehyde resin 324 parts of a 37% aqueous formaldehyde solution are introduced into a suitable reaction chamber equipped with thermometer, stirrer, and reflux condenser and the pH is adjusted to about 5. 120 parts of urea are added and the mixture is heated to reflux in 20 minutes. The pH should be about 5 or adjusted to that point if necessary. The mixture is then heated at reflux for about 2 hours, then cooled to 85° C. and the pH adjusted to about 7.5. 126 parts of melamine are then added and the temperature is maintained at about 85° C. for 90-120 minutes. The reaction mixture is then cooled and the pH is adjusted to about 9. The resultant resinous syrup may be used directly with the polyvinyl acetate emulsion or it may be spray dried for later use.

Any polyvinyl acetate aqueous emulsion or pre-emulsified polyvinyl acetate in the dry state may be used in the preparation of the composition of the present invention. There are a number of methods of preparing these polymers, all of which are well known in the art and it is immaterial which method is selected for the preparation of the polyvinyl acetate. Representative of the processes are those set forth in U. S. Patents 2,388,600, 2,388,602, and 2,398,344.

I claim:
1. A process for post-forming plywood articles comprising coating a plurality of wood plies with an adhesive material comprising an aqueous dispersion of (a) about 5%-25% by weight of emulsified polyvinyl acetate and (b) about 75-95% by weight of a water dispersible thermosetting aminoplast resin selected from the group consisting of melamine-formaldehyde resin and urea-formaldehyde resin, combining said plies into a substantially flat assembly, uniting and cold curing said assembly into a flat, unitary structure by the application of pressure at a temperature between about 25° C.-50° C., surface finishing said flat structure and thereafter deforming said flat structure by the application of heat and pressure thereto between the faces of a mold.

2. A process for post-forming water resistant plywood articles comprising coating a plurality of wood plies with an adhesive material comprising an aqueous dispersion of (a) about 5-25% by weight of emulsified polyvinyl acetate and (b) about 75-95% by weight of a water dispersible thermosetting melamine-formaldehyde resin, combining said plies into a substantially flat assembly, uniting and cold curing said assembly into a flat, unitary structure by the application of pressure at a temperature between about 25° C.-50° C., surface finishing said flat structure and thereafter deforming said flat structure by the application of heat and pressure thereto between the faces of a mold.

3. A process for post-forming water resistant plywood articles comprising coating a plurality of wood plies with an adhesive material comprising an aqueous dispersion of (a) about 5-25% by weight of emulsified polyvinyl acetate and (b) 75-95% by weight of a water dispersible mixture of a thermosetting melamine-formaldehyde resin and a thermosetting urea-formaldehyde resin wherein the urea-formaldehyde constitutes less than 75% of the total resin weight, combining said plies into a substantially flat assembly, uniting and cold curing said assembly into a flat, unitary structure by the application of pressure at a temperature between about 25° C.-50° C., surface finishing said flat structure and thereafter deforming said flat structure by the application of heat and pressure thereto between the faces of a mold.

4. A process for post-forming water resistant plywood articles comprising coating a plurality of wood plies with an adhesive material comprising an aqueous dispersion of (a) about 5-25% by weight of emulsified polyvinyl acetate and (b) about 75-95% by weight of a water dispersible melamine-urea-formaldehyde resin wherein the urea constitutes less than 75% by weight of the total weight of urea and melamine in the resin, uniting and cold curing said assembly into a flat, unitary structure by the application of pressure at a temperature between about 25° C.-50° C., surface finishing said flat structure and thereafter deforming said flat structure by the application of heat and pressure thereto between the faces of a mold.

5. A process for post-forming water resistant plywood articles comprising coating a plurality of wood plies with an adhesive material comprising an aqueous dispersion of (a) about 5-25% by weight of emulsified polyvinyl acetate and (b) about 75-95% by weight of a water dispersible mixture of a thermosetting melamine-formaldehyde resin and a thermosetting urea-formaldehyde resin wherein the urea-formaldehyde resin constitutes between 25-50% of the total resin weight, combining said plies into a substantially flat assembly uniting and cold curing said assembly into a flat, unitary structure by the application of pressure at a temperature between about 25° C.-50° C., surface finishing said flat structure, and thereafter deforming said flat structure by the application of heat and pressure thereto between the faces of a mold.

6. A process for post-forming water resistant plywood articles comprising coating a plurality of wood plies with an adhesive material comprising an aqueous dispersion of (a) about 5–25% by weight of emulsified polyvinyl acetate and (b) about 75–95% by weight of a water dispersible melamine-urea-formaldehyde resin wherein the urea constitutes between 25 and 50% of the total mols of urea and melamine in the resin, uniting and cold curing said assembly into a flat, unitary structure by the application of pressure at a temperature between about 25° C.–50° C., surface finishing said flat structure and thereafter deforming said flat structure by the application of heat and pressure thereto between the faces of a mold.

References Cited in the file of this patent

UNITED STATES PATENTS

| Number | Name | Date |
|---|---|---|
| 657,975 | Wittkowsky | Sept. 18, 1900 |
| 1,125,973 | Davidson | Jan. 26, 1915 |
| 1,642,717 | Bieber | Sept. 20, 1927 |
| 2,474,292 | Weidner et al. | June 28, 1949 |
| 2,532,983 | Alderson | Dec. 5, 1950 |
| 2,534,923 | Nagel et al. | Dec. 19, 1950 |
| 2,584,177 | Wohnsiedler et al. | Feb. 5, 1952 |

FOREIGN PATENTS

| Number | Country | Date |
|---|---|---|
| 488,315 | Great Britain | July 5, 1938 |
| 898,217 | France | June 26, 1944 |